March 28, 1950     C. VERDOORN ET AL     2,501,924
APPARATUS FOR SEPARATING CONTINUOUSLY LIQUID SUCH
AS WATER AND SOLID MATTER SUCH AS SAND
Filed May 6, 1947

Inventors
C. Verdoorn
W.M.C. Visser
By: Kimmel & Crowell
Attys.

Patented Mar. 28, 1950

2,501,924

UNITED STATES PATENT OFFICE 2,501,924

APPARATUS FOR SEPARATING CONTINUOUSLY LIQUID SUCH AS WATER AND SOLID MATTER SUCH AS SAND

Cornelis Verdoorn and Willem Marius Cornelis Visser, Papendrecht, Netherlands

Application May 6, 1947, Serial No. 746,306
In the Netherlands May 6, 1946

3 Claims. (Cl. 210—196)

This invention relates to an apparatus for separating continuously liquid for instance water and solid matter as sand consisting in a number of blades rotatable with a horizontal shaft, from which liquid and solid matter is discharged separately.

In a known apparatus the blades are mounted inclined in lengthwise with respect to the shaft in such a way, that during part of the rotation of the apparatus the water leaves the blades at the inner end, whilst in the next position of the blade the solid matter is discharged at the outer end of the blade.

According to the invention each blade is hollow and provided with a wall pervious to liquid as a sieve, wherein the hollow blade is connected with a liquid outlet conduit arranged about the shaft.

According to the invention in the end of each blade a reservoir is formed separated by a partition wall, in which reservoir the liquid enters through an opening in the partition wall by gravitation, when the said blade occupies a determined position and the liquid leaves the reservoir in another position of the blade passing the sieve in reverse direction and cleaning the said sieve.

According to the invention the blades may be also so formed that the wet mass dropped in the space between the two upper blades gives the apparatus a rotation of such force, that auxiliary devices as a conveyer for sand, can be driven.

Figure 1:
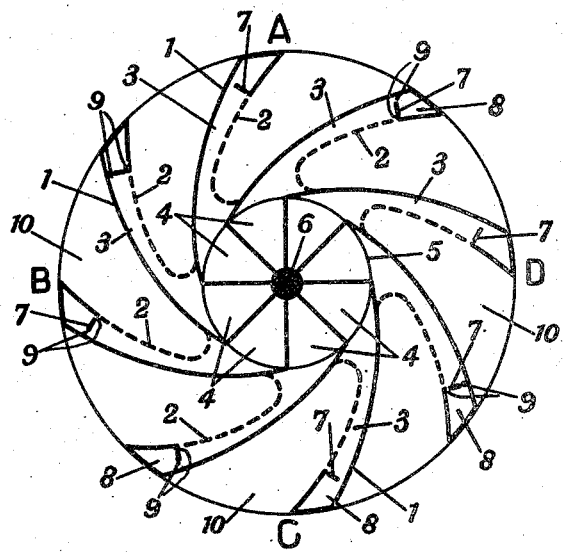
Figure 2:
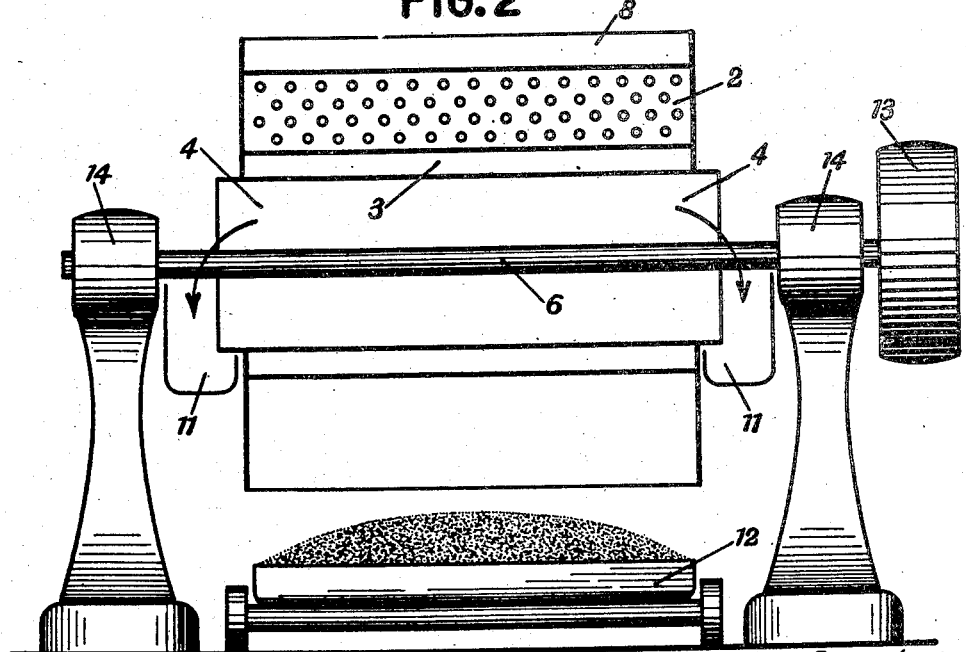

The invention will now be described by way of example with reference to the accompanying drawings in which:

Fig. 1 shows a vertical and
Fig. 2 a horizontal section of the apparatus.

The separating apparatus consists of a horizontal rotatable shaft 6 supported by the bearings 14 having radially extending inner blades fixed thereto, by welding or any other well known means. The inner blades form liquid discharge compartments 4. Attached to the outer end of each inner blade is an outer blade 1. The outer blades are also secured by welding or any other well known means and are extended obliquely with respect to the inner blades. Each outer blade has a solid forward wall (in the direction of rotation of the shaft), an outer wall, a rear wall 2 perforate for a substantial portion of its area and a partition 7 formed at right angles to said rear wall and joined thereto and spaced from the front wall. The rear wall is welded at its inner end to the inner end of the front wall of the following outer blade. The rear wall is imperforate for that portion of its area outboard of the partition 7. The front wall, imperforate portion of the rear wall outer portion and the partition form a water retaining reservoir 8 for a purpose hereinafter set forth.

Circular end plates having centrally disposed openings are secured over the ends of the outer blades to form with the rear wall of one blade, and the front wall of the next adjacent outer blade, a sand retaining chamber 10. The end plate and the front and rear wall of any one outer blade cooperate to form a liquid conveying channel 3. The ends of the liquid discharge compartments are open and ducts 11 are provided for the draining away of the liquid extracted from the wet mass.

Operation

The wet mass is continuously discharged onto the separator from directly above the shaft. Tracing the operation of a single blade, the wet mass is discharged onto the blade in position A and falls into the chamber 10. The shape of this chamber is such that the center of gravity of the wet mass when in chamber 10 will be horizontally displaced relative to the center of rotation. This will result in rotation of the separator. The liquid in the mass will drain through the perforate rear wall of the outer blade and be conveyed along the liquid conveying channel 3. When the blade reaches the position B shown in Figure 1, a portion of the liquid will be conveyed along the solid front wall of the outer blade into the liquid containing reservoir 8, while the sand will continue to remain in the chamber 10. As rotation continues, the blade will reach its lowermost position, indicated as C in Figure 1, the liquid will continue to be retained in the reservoir 8 and the dry sand will be discharged onto the conveyor underneath indicated by the reference numeral 12 in Figure 2. The blade will then begin ascending and when it reaches the position indicated by the letter D, the liquid will be discharged through the opening 9 and will flow back through the perforate rear wall 2, thus cleaning the perforate rear wall of any particles of sand which have been lodged therein during the draining operation. The blade will then be in condition when it reaches point A to once again receive a new charge of wet mass. Since the blades while in their descending travel are loaded with sand and are empty on their upward travel, rotation of the apparatus is caused by the discharge of the sand alone and no outside motor power is required. In fact, the rotative force thereby generated is sufficient to drive a conveyor for removing the sand from underneath the separating apparatus. Figure 2 shows such an arrangement in which the pulley wheel 13 will drive belting for the purpose of moving the conveyor 12.

What we claim is:

1. Apparatus for separating liquid from sand or granular material, comprising a rotary shaft, and a separating member fixed to said shaft, said member comprising a plurality of radially disposed inner blades fixed to said shaft, and a plurality of outer hollow blades extending obliquely from the outer ends of said inner blades and in liquid communication therewith, said hollow blades being formed with a pair of spaced walls with one of said walls perforate, an end wall extending across the ends of said spaced walls, and a perforate partition between said pair of walls spaced inwardly of the end wall and forming therewith an outer liquid chamber.

2. Apparatus for separating liquid from sand or other granular material comprising a rotary shaft, and a separating member fixed to said shaft, said member comprising a plurality of radially disposed inner blades fixed to said shaft and a plurality of volute-shaped hollow outer blades extending obliquely from the outer ends of said inner blades, said outer blades having a pair of spaced apart walls, an end wall connecting said spaced walls, and a partition mounted on the one of said spaced apart walls removed from the direction of rotation intermediate the length thereof and spaced from the other of said spaced apart walls, said first spaced apart wall being perforate for the portion of the length thereof inwardly of said partition and joined at the inner end thereof to the inner end of the next adjacent outer blade.

3. Apparatus for separating liquid from sand or other granular material comprising a rotary shaft and a separating member fixed to said shaft, said member comprising a plurality of radially disposed inner blades fixed to the shaft and extending the length thereof for providing inner liquid discharge compartments, and a plurality of hollow outer blades extending obliquely from the outer ends of said inner blades, each of said outer blades having a front wall in liquid communication with one of said inner blades, a rear wall, an end wall and a partition mounted on said rear wall, said end wall connecting said front and rear walls, said partition extending intermediate the length of the rear wall and extending towards and spaced from said front wall, said rear wall being perforate inwardly of said partition and joined at the inner end thereof to the front wall of the next adjacent outer blade, whereby in one position of said outer blade said perforate portion of said rear wall is adapted to retain the sand or other granular material while draining the liquid to said front wall in communication with said discharge compartment, and in another position said partition, said end wall and said front and rear walls are adapted to trap liquid for cleaning discharge back through said rear wall perforate portion when said outer blade is in still another position.

CORNELIS VERDOORN.
WILLEM MARIUS CORNELIS VISSER.

REFERENCES CITED

The following references are of record in the file of this patent:

UNITED STATES PATENTS

| Number | Name | Date |
|---|---|---|
| 788,511 | Bisseberg | May 2, 1905 |
| 810,066 | Maguin | Jan. 16, 1906 |
| 1,103,725 | Wood | July 14, 1914 |
| 1,157,009 | Lara | Oct. 19, 1915 |

FOREIGN PATENTS

| Number | Country | Date |
|---|---|---|
| 211,475 | Germany | July 1, 1909 |
| 510,034 | Great Britain | July 26, 1939 |